US006079325A

United States Patent [19]

LePoire et al.

[11] Patent Number: 6,079,325

[45] Date of Patent: Jun. 27, 2000

[54] TRACKLESS GANTRY PRESS SYSTEM

[75] Inventors: Robert A. LePoire, Chesterfield; Jose A. Andrade, St. Charles, both of Mo.; Murray Martin, Alma, Canada

[73] Assignee: MiTek Holdings, Inc., Wilmington, Del.

[21] Appl. No.: 09/160,480

[22] Filed: Sep. 25, 1998

[51] Int. Cl.[7] ................................ B30B 3/02; B23P 19/04

[52] U.S. Cl. ........................... 100/210; 29/401.1; 29/432; 29/798; 29/897.31; 100/913; 227/152; 269/910

[58] Field of Search ............................ 100/35, 210, 913; 29/401.1, 432, 798, 897.31; 227/152; 269/910

[56] References Cited

U.S. PATENT DOCUMENTS

| | | | |
|---|---|---|---|
| 3,255,943 | 6/1966 | Sanford | 100/913 |
| 3,419,205 | 12/1968 | Jureit et al. . | |
| 3,538,843 | 11/1970 | Lubin | 100/913 |
| 3,540,107 | 11/1970 | Jureit et al. . | |
| 3,605,608 | 9/1971 | Dagley | 100/913 |
| 3,628,714 | 12/1971 | Offenwanger | 227/152 |
| 3,711,007 | 1/1973 | Fry | 227/152 |
| 4,024,809 | 5/1977 | Moehlenpah | 100/913 |
| 4,295,269 | 10/1981 | Wright . | |
| 4,351,465 | 9/1982 | Moehlenpah et al. . | |
| 4,373,652 | 2/1983 | Matlock et al. . | |
| 4,437,234 | 3/1984 | Thornton . | |
| 5,933,957 | 8/1999 | Haase | 100/913 |

OTHER PUBLICATIONS

MiTek MARK V™ Gantry System, 1993, 4 pgs.

MiTek Roller Gantry Roller Press System, 1994, 4 pgs.

MiTek RailRider™ Trackless Floor Truss Roller System, 1997, 4 pgs.

*Primary Examiner*—Stephen F. Gerrity

*Attorney, Agent, or Firm*—Armstrong Teasdale LLP

[57] ABSTRACT

Trackless gantry press apparatus includes, in one embodiment, a plurality of truss setup tables configured to form a row of spaced truss setup tables. Each table includes wheel guides coupled at opposing ends and extending the width of the table. The guides are configured to be in substantial alignment with the guides coupled to adjacent tables. The apparatus also includes a press assembly for pressing nailing plates into truss members. The press assembly includes a substantially cylindrically shaped roller movably coupled to a substantially inverted U-shaped frame. The press assembly also includes at least four support wheels and at least four reaction pressure wheels coupled to each opposite end of the frame and configured so that at least three support wheels on each end of the press assembly are in contact with the wheel guides at all times as the press assembly traverses the spaces between the spaced setup tables. Additionally, a motor is operatively coupled to the roller and the drive wheels and configured so that the roller and the drive wheels rotate at the same speed.

35 Claims, 6 Drawing Sheets

TRACKLESS GANTRY PRESS SYSTEM

FIELD OF THE INVENTION

This invention relates generally to an apparatus for use in the manufacture of trusses and, more particularly, to a gantry press apparatus for assembling a prefabricated truss on a plurality of spaced setup tables.

BACKGROUND OF THE INVENTION

Prefabricated trusses are often used in the construction of building structures because of their strength, reliability, low cost, and ease of use. The trusses are typically assembled in a factory using machinery for mass-fabrication of individual truss components. The trusses are assembled, for example, on large assembly or setup tables and then shipped to construction sites.

A prefabricated truss typically includes truss members coupled by nailing plates. Each truss member has a first surface and a second surface, and the truss members are pre-cut for a pre-defined truss configuration. Trusses may be fabricated to span large distances. For example, 30, 60, or 100 feet span distances are not uncommon. Fabricating such large trusses necessitates the use of multiple setup tables. A single work surface would require an unusually large table and would require the workers to crawl onto the table work surface or to reach extremely long distances to correctly position the truss members and nailing plates on the table work surface. Multiple setup tables arranged in a row with isles between the tables permit workers to walk between the tables to position the truss members on the work surfaces of the tables to reduce crawling onto the work surface of the tables. The isles between setup tables also facilitate removal of the trusses from the setup tables after production.

In assembling trusses, truss members are arranged on truss assembly setup tables, and nailing plates having nail like projections or teeth extending from one side are placed at the intersections of the truss members with their teeth pointed toward the first and second surfaces. The plates are then pressed into the truss members using, for example, a roller or a vertical press. Typically, a gantry press is used to embed the nailing plate teeth into the truss members, moving along the row of spaced setup tables and pressing the nailing plates into the truss members forming trusses. In some lines one large truss may be assembled over several tables, or several trusses may be setup on the tables and then the gantry press rolls over the line of tables pressing the nailing plates into the truss members of the several trusses.

Modern gantry presses include a gantry frame that travels on two tracks mounted to the floor along opposite sides of the truss table. Typically, light crane rail tracks are used. A vertical press or a roller press may be mounted to the gantry frame at a predetermined distance above a truss table work-surface so that as the gantry frame moves along the tracks, the nailing plates are pressed into the truss members.

The installation of the gantry press tracks is critical in the proper operation of the gantry press. In a typical installation, the tracks are spaced away from the sides of the truss tables to provide adequate clearance for the gantry press frame. Since the gantry press rides on the tracks, the tracks must be level and true with respect to each truss table work-surface. Due to the size and weight of the gantry press, the tracks must be securely fastened to the floor and made of a suitable material, typically, steel. During use of a truss table, an operator places the truss members and nailing plates on the truss setup tables work-surface, requiring the operator to step over the tracks to access the isles between the setup tables, or stand farther from the table and extend the truss members and nailing plates an additional distance. The tracks may become tripping hazards or impede worker movement and thus worker productivity. Due to the size and spacing of the tracks, easy access to the truss table work-surface and areas between the truss tables is impeded and throughput is reduced.

One attempt to overcome some of the above described problems is a trackless roller press described in assignee's co-pending patent application Ser. No. 08/951,116, now U.S. Pat. No. 5,933,957. The trackless roller press eliminates the floor track to allow workers closer access to the setup table, but the roller press cannot traverse from table to table in a line of multiple, spaced truss setup tables. The roller press described in patent application Ser. No. 08/951,116, now U.S. Pat. No. 5,933,957 attaches to a single truss setup table.

It would be desirable to provide a gantry press apparatus which enables fabrication of trusses without requiring that tracks be placed on the floor next to the truss setup tables to permit unimpeded access to the truss tables and the isles between the truss tables. It would also be desirable to provide an apparatus which moves easily from one truss table to the next in an assembly line of multiple, spaced tables.

SUMMARY OF THE INVENTION

These and other objects may be attained by a trackless gantry press apparatus that provides unimpeded access to the work-surface of the truss tables in a truss assembly line by elimination of tracks mounted on the floor adjacent the truss tables. The trackless gantry press easily traverses from one truss setup table to an adjacent setup table in a truss assembly line that includes a plurality of spaced truss setup tables arranged in a row and having substantially coplanar work surfaces.

The apparatus includes, in one embodiment, a press assembly for pressing nailing plates into truss members. The press assembly may be a vertical press or a roller press. The press assembly, in one embodiment, is a roller press and includes a substantially cylindrically shaped roller movably coupled to a substantially inverted U-shaped frame. The press assembly also includes at least four points of support configured to support the press assembly along one edge of at least two spaced truss setup tables arranged in a row. Typically, the press assembly is supported adjacent two opposing edges of the truss tables with at least four points of support located at each opposing edge. The points of support are configured so that at least three points of support are supporting the press assembly along each of the two opposing edges of the truss tables at any point during travel of the press assembly from one truss table to the other.

In a preferred embodiment, each point of support is a support wheel coupled to the press assembly frame. At least two of the support wheels are driven wheels and are configured so that at least one drive wheel along each edge of the table is always in contact with a truss setup table during operation. Additionally, the press assembly may include a plurality of reaction pressure wheels coupled to the frame. In one embodiment, at least eight drive wheels and at least eight reaction pressure wheels are coupled to the frame, four drive wheels and four pressure wheels on each side of the press assembly. The wheels are configured so that at least six drive wheels, three on each side of the press, are in contact with the truss setup tables at all times. Also, a motor is movably coupled to the roller and the drive wheels and configured so that the roller and the drive wheels rotate at the same speed.

The trackless gantry press apparatus also includes, in one embodiment, a plurality of truss setup tables arranged in a row. Each table includes wheel guides coupled at opposing ends and extending the width of the table. The guides are configured to be in substantial alignment with the guides coupled to adjacent tables and to be parallel to the truss table work surface. The guides do not extend between the spaced setup tables thereby providing for unimpeded access to the isles between the setup tables.

Each drive wheel is configured to engage a top surface of a roller guide to move the press assembly in relation to the truss tables. Each pressure wheel is configured to engage a bottom surface of a roller guide and to add to the pressing force imparted by the roller onto the nailing plates. To enable the press assembly to traverse from table to table and to maintain a pressing force on the nailing plates on the trusses, the centerline distance between drive wheels is configured to be greater than the distance between adjacent truss setup tables.

To fabricate trusses using the above described trackless gantry press apparatus, truss members are positioned on truss setup tables work-surfaces and then nailing plates are positioned on the first and second surfaces of the truss members. A truss may be assembled on each truss table in the row of truss tables that forms the assembly line. However, typically a single truss spans several tables in the line, and more than one truss spanning several tables may be assembled at any one time on the setup tables in the assembly line. The nailing plates are then pressed into the truss members using the press assembly. Specifically, the press assembly roller presses the nailing plates into the truss members as the press assembly moves between the ends of a truss table and then traverses to each adjacent table in succession until reaching the last table in the assembly line.

The press assembly is moved by energizing the motor so that the roller and drive wheels rotate. The drive wheels move the press assembly relative to the truss tables until the roller is adjacent the truss members. The roller then rolls onto the surface of the truss and the nailing plates. Teeth of the nailing plates are pressed into the truss members as a result of proper roller and pressure wheel spacing. The roller is spaced above the work-surface so that as the roller rolls onto the nailing plates the drive wheels would be lifted from the wheel guides creating a pressing force equal to the weight of the press assembly. Typically that amount of force is insufficient to press the nailing plates into the truss members. To increase the pressing force, the reaction pressure wheels are configured to engage the bottom of the wheel guides to prevent the drive wheels from lifting from the wheel guides. Preventing the drive wheels from lifting from the wheel guides creates a compression force on the nailing plates that is sufficient to press the nailing plates into the truss.

The above described trackless gantry roller apparatus moves easily from one truss setup table to the next in a multi-table assembly line. Additionally, by eliminating tracks mounted on the floor adjacent the truss tables, the roller apparatus provides unimpeded access to the work-surface of the truss tables and the isles between the truss tables in the truss assembly line. The unimpeded access to the truss tables provides improved worker safety and improved worker productivity.

DETAILED DESCRIPTION

Figure 1:
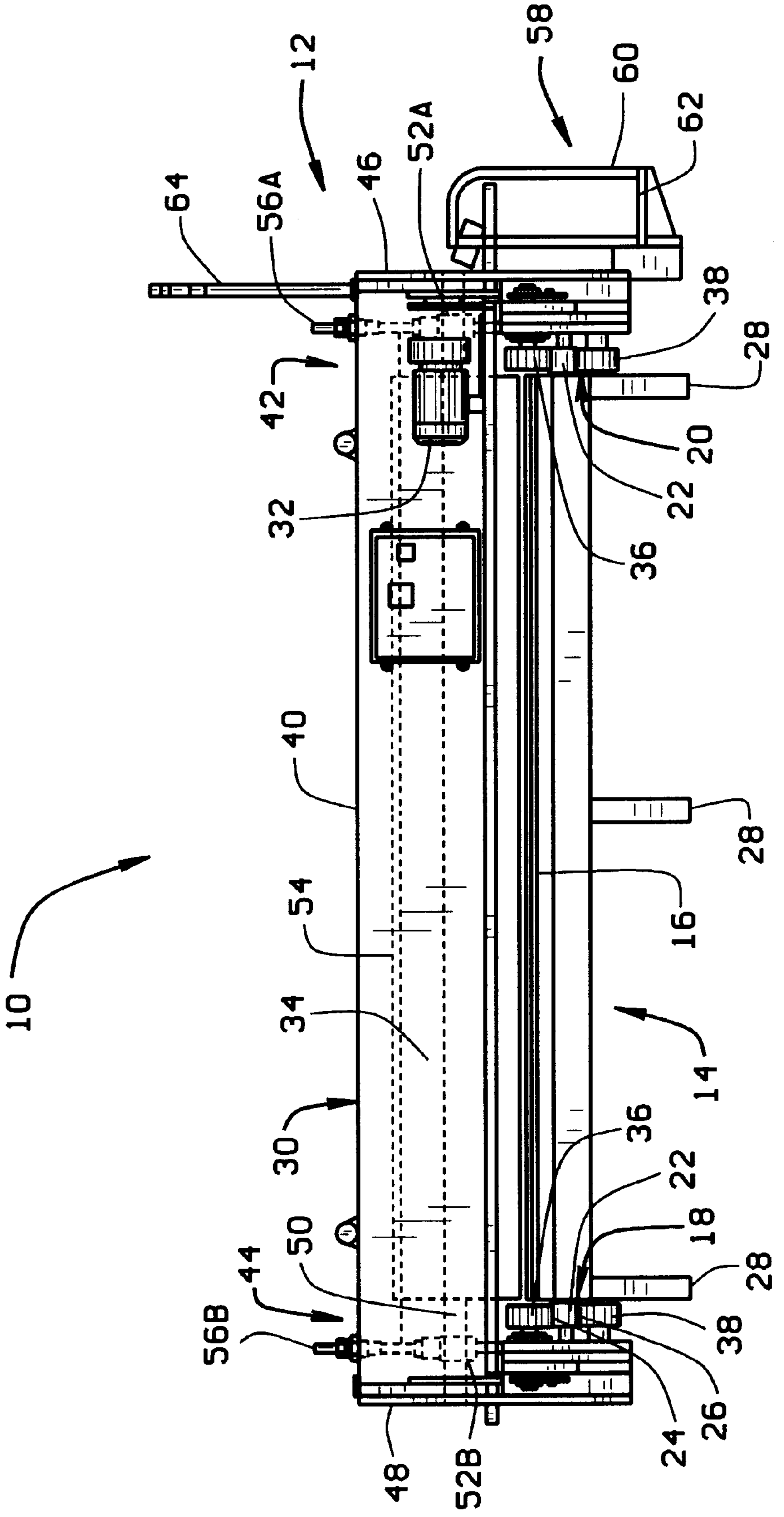
FIG. 1 is a front view of a trackless gantry press apparatus in accordance with one embodiment of the present invention.

FIG. 1 is a front view of a trackless gantry press apparatus 10 in accordance with one embodiment of the present invention. Apparatus 10 includes a press assembly 12 and a plurality of spaced truss setup tables 14 (one shown) configured to form a row of truss setup tables 14. Press assembly 12 is configured to traverse to each adjacent truss table 14 in succession.

Truss table 14 includes a top work-surface 16, a first side 18 and a second side 20 opposite first side 18. The plurality of spaced truss setup tables 14 in the row are configured to have substantially coplanar work surfaces 16. Wheel guides 22 are coupled to table 14 at side 18, and at opposing side 20. Guides 22 include box-shaped channel members having a top 24 and a bottom 26. Guides 22 do not extend between spaced setup tables 14 thereby providing for unimpeded access to the isles between tables 14. Table 14 is supported by table legs 28.

Press assembly 12 may be a vertical press or a roller press. In the embodiment illustrated in FIG. 1, press assembly 12 is a roller press and includes an inverted U-shaped frame 30, a motor 32, a roller 34, drive wheels, 36, and pressure wheels 38. Frame 30 includes an elongate horizontal portion 40 having a first end 42 and a second end 44. Frame 30 also includes a first vertical portion 46 depending from first end 42 of horizontal portion 40 of frame 30. A second vertical portion 48 depends from second end 44 of horizontal portion 40.

Motor 32 is coupled to first vertical portion 46 of frame 30. Motor 32 is operatively coupled to roller 34 and drive wheels 36. Drive wheels 36 are configured to engage top 24 of guides 22, and pressure rollers 38 are configured to engage bottom 26 of guides 22. In another embodiment, press assembly 12 includes at least two wheels 36 that are drive wheels with wheels 36 configured so that at least one driven wheel 36 is in contact with guide 22 at all times during operation of apparatus 10.

Wheels 36 support press assembly 12, and each wheel 36 is a point of support for press assembly 12. Wheels 36 are configured so that there are four points of support adjacent each end of press assembly 12, and as press assembly traverses from one setup table 14 to an adjacent spaced setup table 14, there are always at least three points of support at each end of press assembly 12 in contact with truss setup tables 14. In other embodiments, there may be more than four points of support at each end of press assembly 12. Additionally, to enable press assembly 12 to traverse from truss table 14 to adjacent truss table 14 and maintain a pressing force, the centerline distance between any two adjacent support points is configured to be greater than the maximum distance between adjacent truss setup tables 14. Particularly, the centerline distance between any two adjacent wheels 36 is configured to be greater than the maximum distance between adjacent truss setup tables 14.

Roller 34 is substantially cylindrically shaped, and a center shaft 50 extends from opposing ends of roller 34. Roller 34 extends between first and second vertical portions 46 and 48 of frame 30. Roller 34 is steel or other similar material which can apply necessary compressive forces without significant flexing. Roller 34 is rotatably coupled to take-up bearings 52A and 52B and is configured so that the axis of roller 34 is parallel to table work-surface 16. Roller 34 also includes outer surface 54. Roller adjustment subassemblies 56A and 56B are coupled to respective take-up bearings 52A and 52B so that roller 34 may be adjusted up and down relative to table work-surface 16. Adjustment subassemblies 56A and 56B are also coupled to horizontal portion 40 of frame 30 at ends 42 and 44 respectively.

Apparatus 10 also includes an operator platform 58 coupled to press assembly 12 at first vertical portion 46 of frame 30. Platform 58 includes a hand rail 60 and a foot step 62. Mast 64 is a substantially elongate member coupled to frame 30 to support power source interconnections (not shown) to trackless roller apparatus 10.

Figure 2:
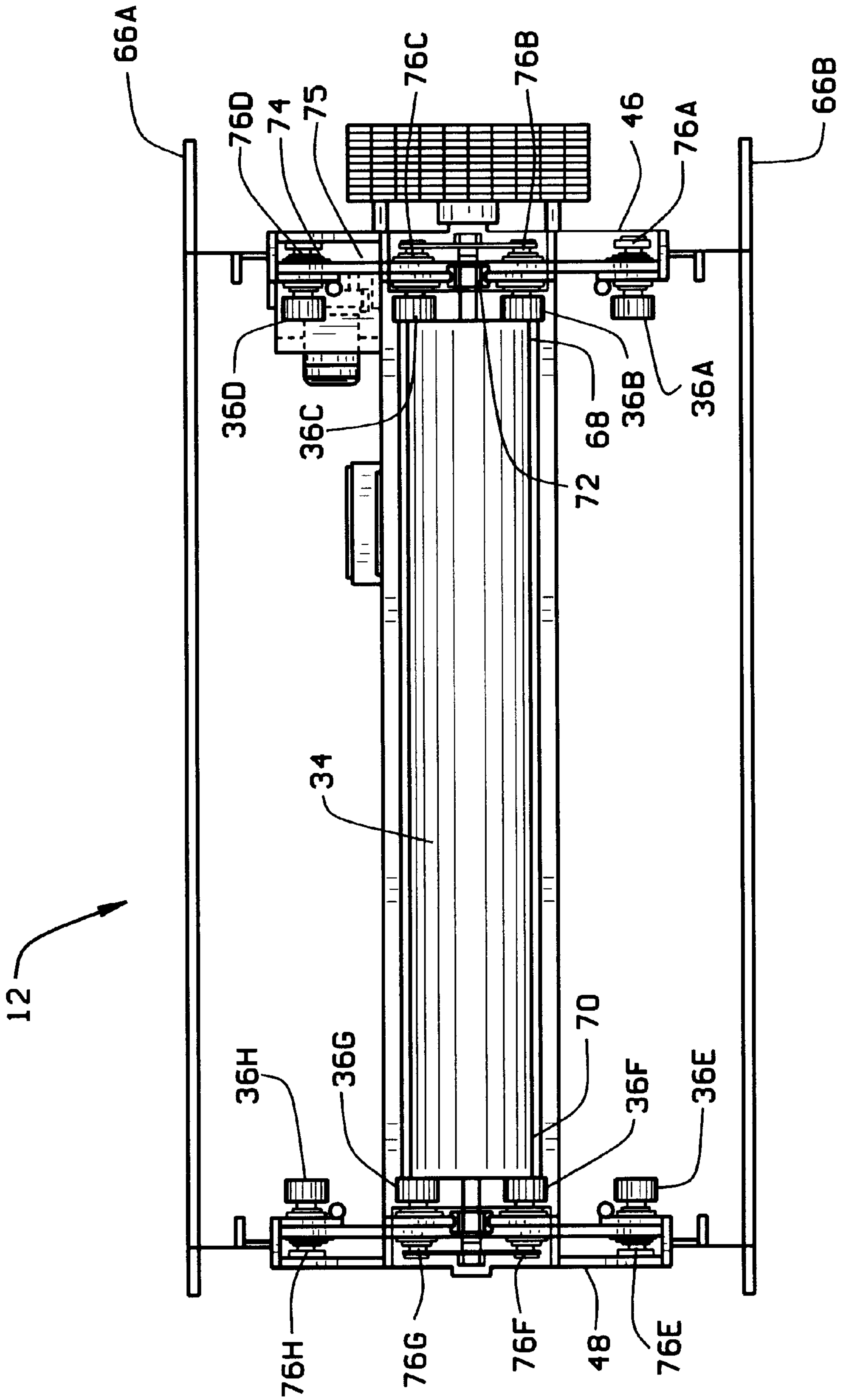
FIG. 2 is a top view of the press apparatus shown in FIG. 1.

FIG. 2 is a top view of press assembly 12. Press assembly 12 includes push bars 66A and 66B extending between and coupled to first and second vertical portions 46 and 48 of frame 30. As shown in FIG. 2, roller 34 has a first end 68 and a second end 70. Chain sprocket 72 is coupled to roller 34 at first end 68. Drive sprocket 74 is coupled to motor 32. Chain 75 couples motor drive sprocket 74 to roller chain sprocket 72.

Drive wheels 36A, 36B, 36C, and 36D are rotatably coupled to first vertical portion 46 of frame 30, and drive wheels 36E, 36F, 36G, and 36H are rotatably coupled to second vertical portion 48 of frame 30. Drive wheel sprockets 76A, 76B, 76C, 76D, 76E, 76F, 76G, and 76H are coupled to drive wheels 36A, 36B, 36C, 36D, 36E, 36F, 36G, and 36H. Drive wheels 36A, 36B, 36C, 36D, 36E, 36F, 36G, and 36H may be fabricated from any suitable material such as steel with an outer layer of polyurethane elastomer to provide for quiet operation as roller apparatus 12 traverses from one truss table 14 (shown in FIG. 1) to another truss table 14. Polyurethane wheels are commercially available, for example, from Albion Industries, Inc., Albion, Mich. under the trade name ALATHANE wheels.

Figure 3:
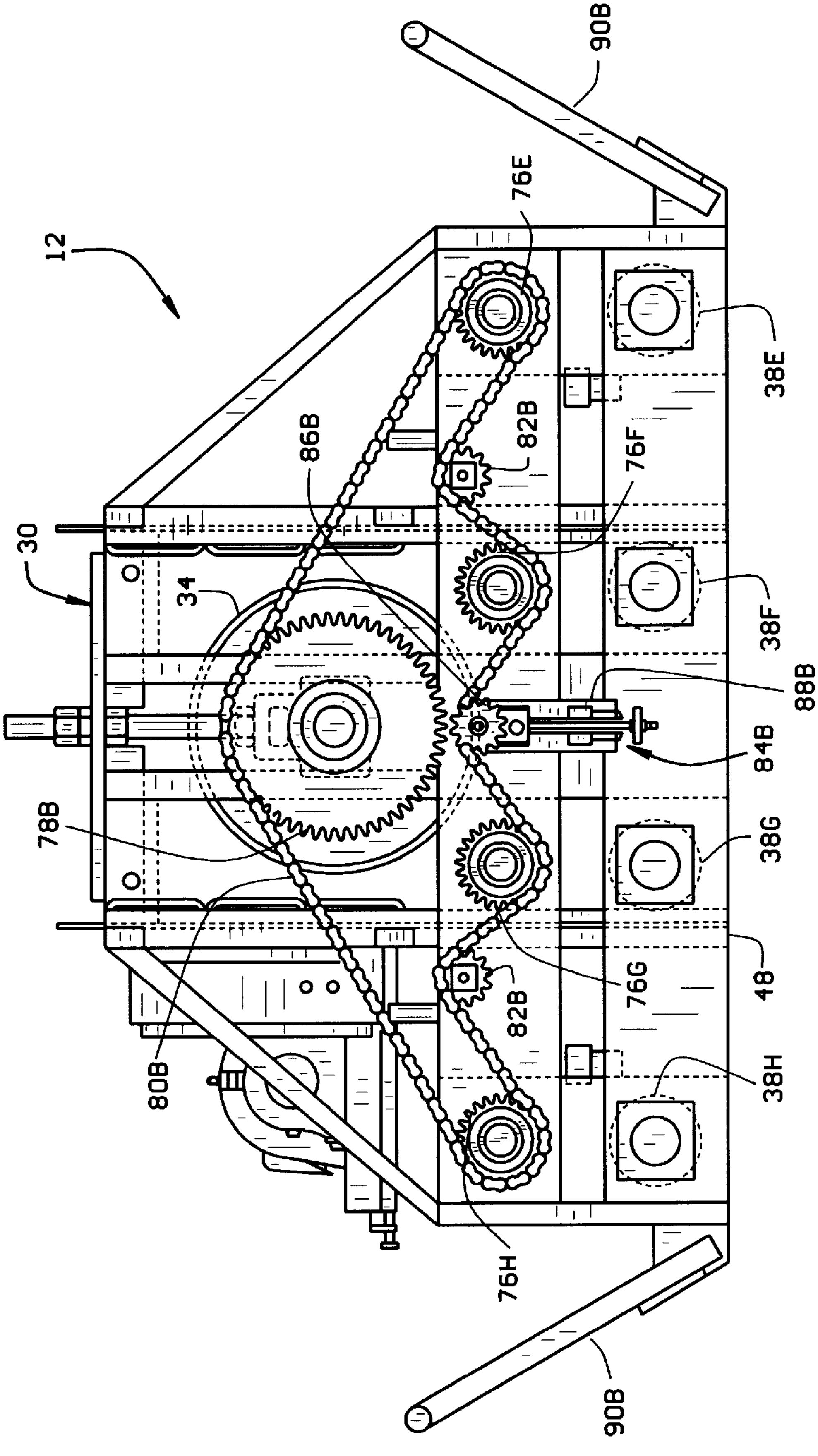
FIG. 3 is a side view of the press apparatus shown in FIG. 1.

FIG. 3 is a side view of press assembly 12 showing second vertical portion 48 of frame 30, and chain sprocket 78B coupled to roller 34. Drive chain 80B is coupled to sprocket 78B and to drive wheel sprockets 76E, 76F, 76G, and 76H. As roller 34 is rotated by motor 32 with drive chain 75 (shown in FIG. 2), sprocket 78B rotates, moving drive chain 80B, which in turn rotates drive wheel sprockets 76E, 76F, 76G, and 76H causing drive wheels 36E, 36F, 36G, and 36H (shown in FIG. 2) to rotate. Sprockets 78B and 76E, 76F, 76G, and 76H are sized so that roller 34 and drive wheels 36E, 36F, 36G, and 36H rotate so that the surface speed of roller 34 is the same as the surface speed of drive wheels 36E, 36F, 36G, and 36H.

Guide sprockets 82B guide drive chain 80B between drive wheel sprockets 76E, 76F, 76G, and 76H. A chain take-up assembly 84B adjusts the tension of chain 80B. Chain take-up assembly 84B includes a tension sprocket 86B movably coupled to a screw mechanism 88B.

Pressure wheels 38E, 38F, 38G, and 38H are rotatably coupled to second vertical portion 48 of frame 30. Safety shut-off arms 90B are coupled to opposing ends of vertical portion 48.

First vertical portion 46 of frame 30 is configured similar to second vertical portion 48, described above, except that motor 32 is also coupled to first vertical portion 46.

Figure 4:
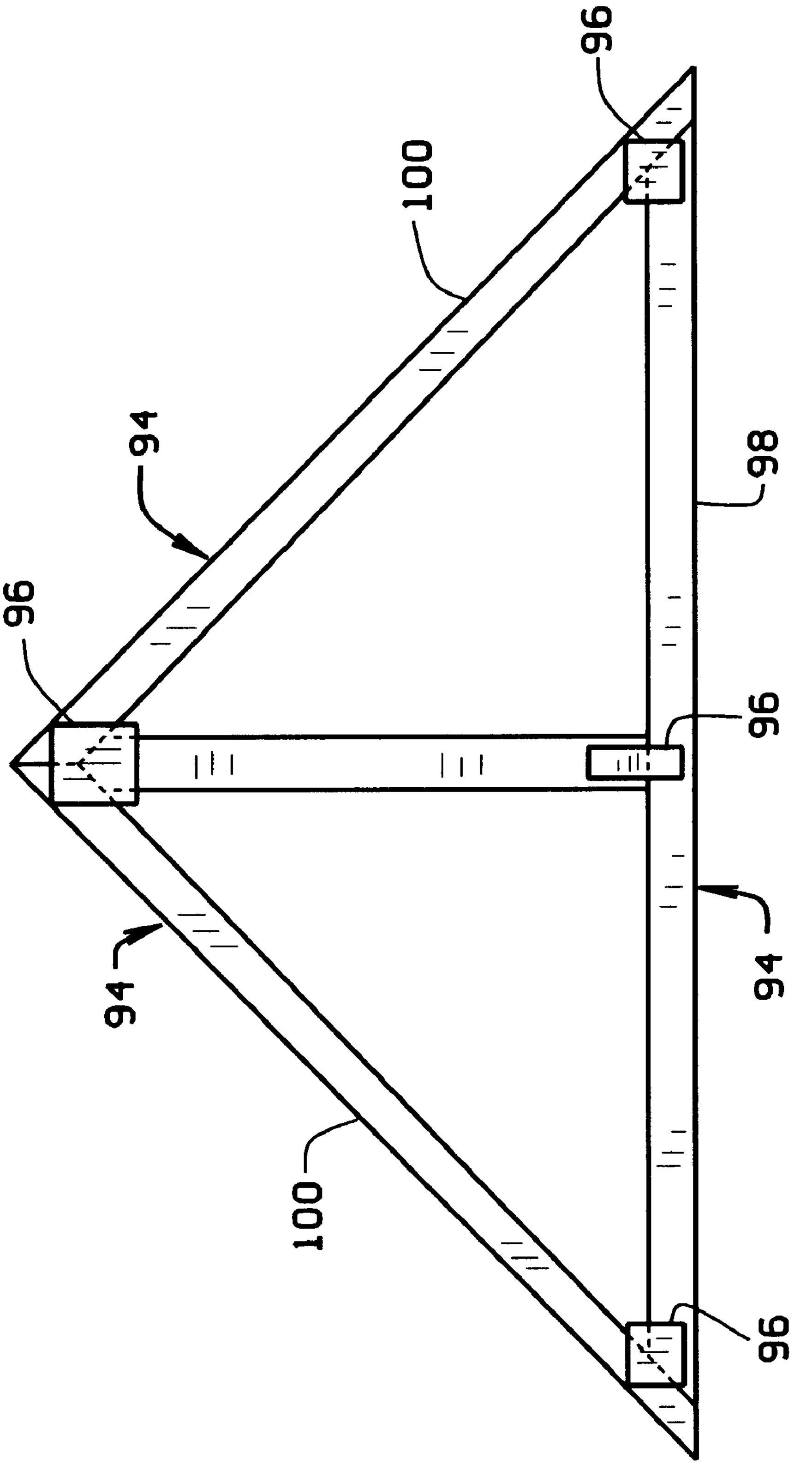
FIG. 4 is a top view of a truss.

FIG. 4 is a top view of a truss 92. Truss 92 includes truss member 94 connected together by nailing plates 96. Truss members may include a lower chord 98, upper chords 100, and web members extending between upper and lower chords 98 and 100.

To fabricate trusses 92 using the above described trackless gantry press apparatus 10, truss members 94 are positioned on a truss table work-surface 16 and then nailing plates 96 are positioned on opposing sides of truss members 94. A truss 92 may be assembled on each truss table 14 in the row of truss tables that are part of apparatus 10, or a truss 92 may span several truss tables 14. Nailing plates 96 are then pressed into truss members 94 using press assembly 12. Specifically, press assembly roller 34 presses nailing plates 96 into the truss members 94 as press assembly 12 moves between ends of a truss table 14 and then traverses to each adjacent table 14 in succession.

Press assembly 12 is moved by energizing motor 32 so that roller 34 and drive wheels 36 rotate. Drive wheels 36A, 36B, 36C, 36D, 36E, 36F, 36G, and 36H move press assembly 12 relative to truss tables 14 until roller 34 is adjacent truss members 94. After roller 34 is adjacent to truss members 94, roller 34 rolls onto the surface of truss 92 and nailing plates 96. Nailing plates 96 are pressed into truss members 94 as a result of proper roller 34 and pressure wheel 38 spacing. Roller 34 is spaced above work-surface 16 so that as roller 34 rolls onto nailing plates 96, drive wheels 36A, 36B, 36C, 36D, 36E, 36F, 36G, and 36H would be lifted from wheel guides 22 creating a pressing force equal to the weight of roller apparatus 12. Typically that amount of force is insufficient to press nailing plates 96 into truss members 94. To increase the pressing force, reaction pressure wheels 38A, 38B, 38C, 38D, 38E, 38F, 38G, and 38H are configured to engage bottom 26 of wheel guides 22 to prevent drive wheels 36A, 36B, 36C, 36D, 36E, 36F, 36G, and 36H from lifting from wheel guides 22. Preventing drive wheels 36A, 36B, 36C, 36D, 36E, 36F, 36G, and 36H from lifting from wheel guides 22 creates a compression force acting on nailing plates 96 that is sufficient to press nailing plates 96 into truss members 94. In another embodiment, when the weight of roller press 12 is sufficient to press nailing plates 96 into truss members 94, reaction pressure wheels 38 may be eliminated.

The above described trackless gantry roller apparatus 10 moves easily from one truss table 14 to the next in a multi-table assembly line. Additionally, gantry roller apparatus 10 provides unimpeded access to work-surface 16 of truss tables 14 in the truss assembly line by eliminating tracks mounted on the floor adjacent truss tables 14.

Figure 5:
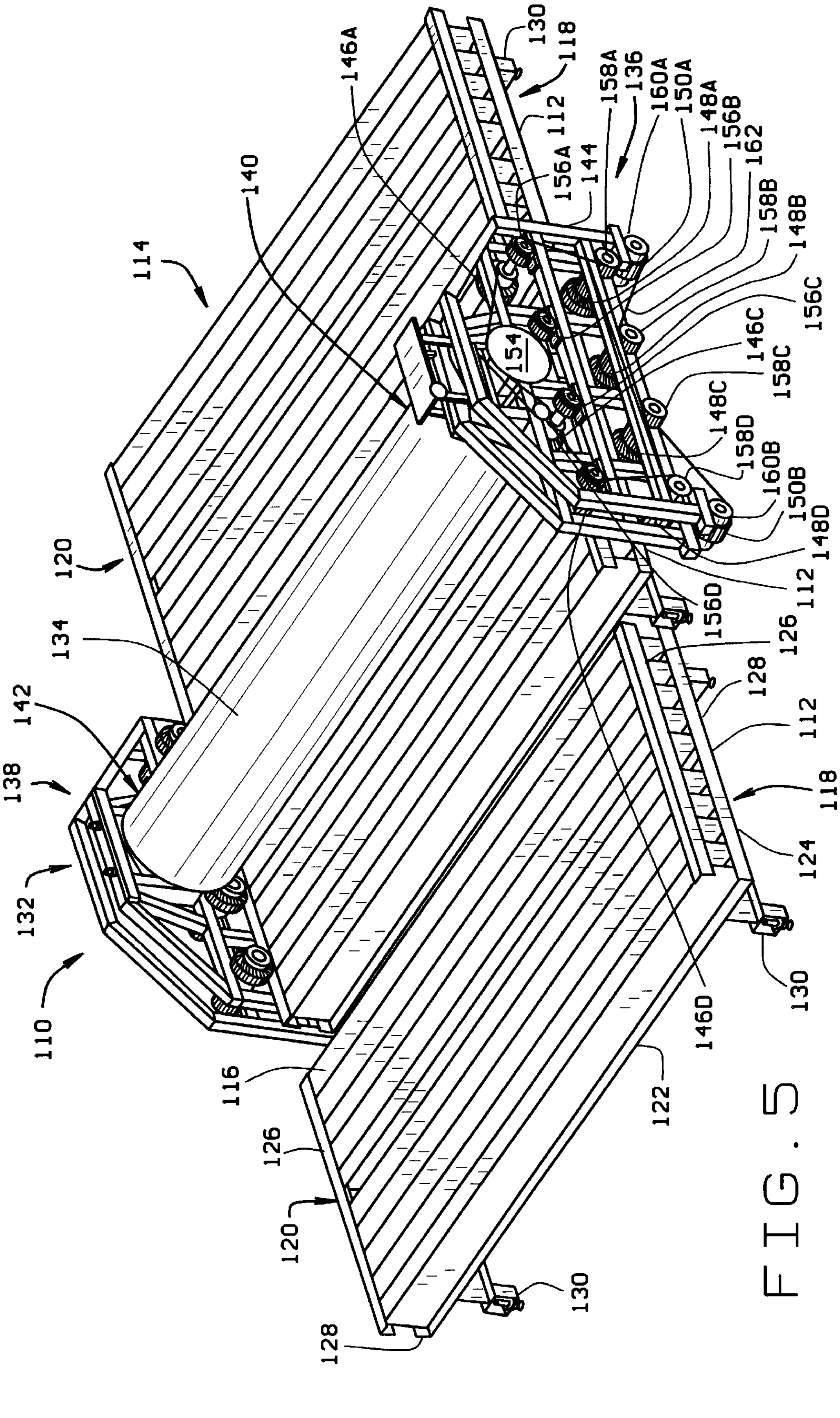
FIG. 5 is a perspective view of a trackless gantry press apparatus in accordance with another embodiment of the present invention.

FIG. 5 is a perspective view of a trackless gantry press apparatus 110 in accordance with another embodiment of the present invention. Apparatus 110 includes a plurality of spaced truss setup tables 112 arranged to form a row 114. Truss table 112 includes a top work surface 116, a first side 118, a second side 120 opposite first side 118, and a bottom surface 122.

Wheel guides 124 are coupled to sides 118 and 120 of table 112. Wheel guides 124 include an upper L-shaped channel member 126 and a lower L-shaped channel member 128. Upper channel member 126 is configured to overlie top work-surface 116 and a side of truss table 112, either side 118 or side 120. Lower channel member 128 is configured to overlie bottom surface 122 and a side of truss table 112, either side 118 or side 120.

Truss table 112 is supported by legs 130. Each truss table 112 in row 114 is configured so that wheel guides 124 and work-surface 116 are in substantial alignment with wheel guides 124 and work-surface 116 of adjacent tables 112.

Trackless gantry press apparatus 110 also includes a press assembly 132. Press assembly 132 includes a roller 134, and wheel subassemblies 136 and 138 coupled to roller 134.

Particularly, wheel subassembly 136 is coupled at a first end 140 of roller 134, and wheel subassembly 138 is coupled at a second end 142 of roller 134.

Wheel assembly 136 includes a frame 144, upper drive wheels 146A, 146B, 146C and 146D movably coupled to frame 144, and lower drive wheels 148A, 148B, 148C and 148D movably coupled to frame 144. Upper drive wheels 146A, 146B, 146C and 146D are configured to engage upper channel member 126 of wheel guide 124, and lower drive wheels 148A, 148B, 148C and 148D are configured to engage lower channel member 128 of wheel guide 124. Floor drive wheels 150A and 150B are movably coupled to frame 144, and are configured to engage a floor 152. Additionally, truss table legs 130 are configured to rest on floor 152.

A drive chain sprocket 154 is coupled to first end 140 of roller 134. Drive chain sprocket is movably coupled to upper drive wheel sprockets 156A, 156B, 156C, and 156D, lower drive wheel sprockets 158A, 158B, 158C, and 158D, and floor wheel sprockets 160A and 160B by drive chain 162. Upper drive wheel sprockets 156A, 156B, 156C, and 156D are coupled to upper drive wheels 146A, 146B, 146C and 146D, lower drive wheel sprockets 158A, 158B, 158C, and 158D are coupled to lower drive wheels 148A, 148B, 148C and 148D, and floor wheel sprockets 160A and 160B are coupled to floor drive wheels 150A and 150B.

In addition to engaging lower channel members 128 of wheel guides 124, lower drive wheels 148A, 148B, 148C and 148D also perform the same function as pressure wheels 38 described above. Particularly, lower drive wheels 148A, 148B, 148C and 148D prevent upper drive wheels 146A, 146B, 146C and 146D from lifting from upper channel members 126 as roller 134 rolls onto nailing plates 96 (shown in FIG. 4) creating a compression force acting on nailing plates 96 to press nailing plates 96 into truss members 94 (shown in FIG. 4).

Wheel subassembly 138 is configured similar to wheel subassembly 136, described above, except that a motor (not shown) is also coupled to wheel subassembly 138.

Figure 6:
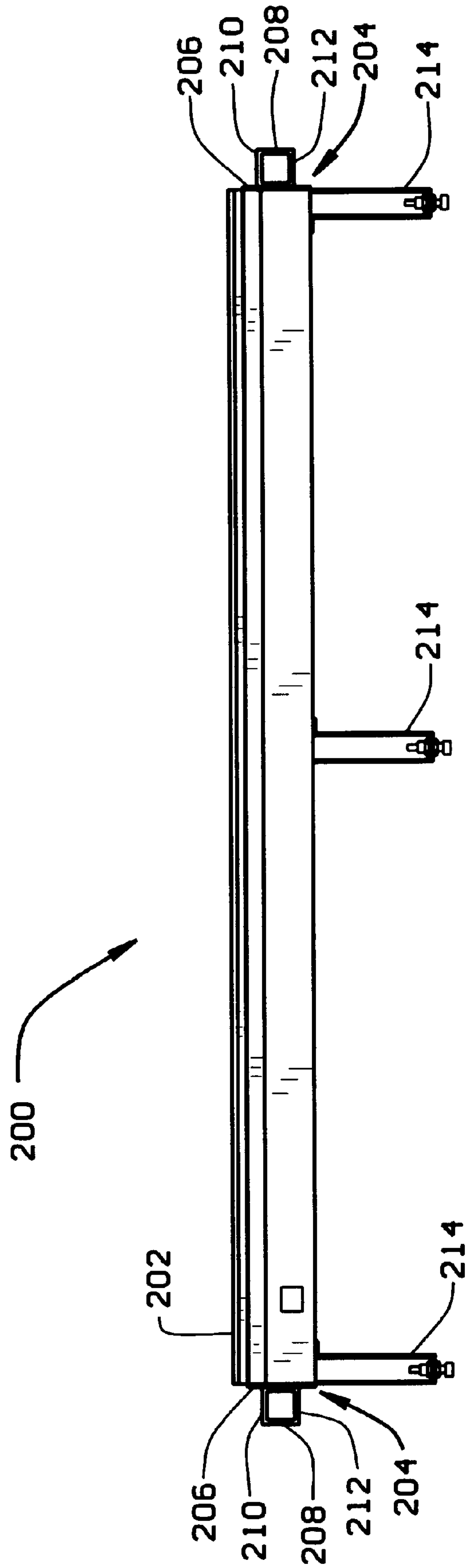
FIG. 6 is a front view of a truss table in accordance with another embodiment of the present invention.

FIG. 6 is a front view of a truss table 200 in accordance with another embodiment of the present invention. Truss table 200 includes a top worksurface 202, a first side 204 and a second side 206 opposite first side 204. Support plates 206 are coupled to truss table 200 at side 204, and at opposing side 206. Wheel guides 208 are coupled to support plates 206 at first side 202, and at opposing side 204. Support plates 206 provide added strength to truss table 200. Guides 208 include box-shaped channel members having a top 210 and a bottom 212. Table 200 is supported by table legs 214.

A conventional truss table may be converted to a truss table configured to support press assembly 12 (shown in FIG. 1) by coupling wheel guides 208 to opposing edges of the conventional truss table. In another embodiment, support plates 206 may be coupled to the opposing edges and then wheel guides 208 are coupled to support plates 206 to form truss table 200.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A gantry press apparatus for fabricating trusses on a plurality of spaced truss setup tables, the setup tables having substantially coplanar work surfaces and arranged in a row, each truss including a plurality of wooden truss members and a plurality of nailing plates having teeth extending from one side, said gantry press apparatus comprising:

a press assembly configured to be mounted, at a first end, for movement across the work surfaces of successive setup tables in the row and the spacing therebetween, said first end of said press assembly comprising four support points configured such that at least three of said support points are in contact with at least one of the tables at any point during the movement of said press assembly across the space between successive setup tables.

2. An apparatus in accordance with claim 1 wherein said press assembly is configured to be mounted, at a second end, for movement across the work surfaces of successive setup tables in the row and the spacing therebetween, said second end of said press assembly comprising four support points configured such that at least three of said support points are in contact with at least one of the tables at any point during the movement of said press assembly across the space between successive setup tables.

3. An apparatus in accordance with claim 2 wherein a maximum distance between adjacent tables in the row of spaced truss setup tables is X, and a centerline distance between any two adjacent support points is greater than X.

4. An apparatus in accordance with claim 3 wherein each said support point comprises a wheel coupled to said press assembly.

5. An apparatus in accordance with claim 4 wherein at least two of said wheels located at said first end and at least two of said wheels located at said second end of said press assembly are drive wheels, said wheels configured such that at least one drive wheel located at said first end and at least one drive wheel located at said second end of said press assembly is in contact with the truss setup tables at any point during the movement of said press assembly across the space between successive setup tables.

6. An apparatus in accordance with claim 5 wherein said press assembly is a roller press assembly.

7. An apparatus in accordance with claim 6 wherein said press assembly further comprises:

a frame;

a roller coupled to said frame, said roller configured to embed the nailing plate teeth into the truss members; and a motor operatively coupled to said roller and said drive wheels.

8. An apparatus in accordance with claim 7 wherein said roller and said drive wheels are configured to rotate so that a surface speed of said roller is equal to a surface speed of said drive wheels.

9. An apparatus in accordance with claim 7 wherein said frame comprises an elongate horizontal portion having a first end and a second end, a first vertical portion depending from said first end of said horizontal portion, and a second vertical portion depending from said second end of said horizontal portion.

10. An apparatus in accordance with claim 9 wherein said press assembly comprises at least four drive wheels and at least four pressure wheels coupled to said first vertical portion of said frame, and at least four drive wheels and at least four pressure wheels coupled to said second vertical portion of said frame.

11. A gantry press apparatus for fabricating trusses, each truss including a plurality of wooden truss members and a plurality of nailing plates having teeth extending from one side, said apparatus comprising:

a plurality of spaced truss setup tables, said setup tables having substantially coplanar work surfaces and arranged in a row;

a press assembly mounted, at a first end, for movement across said work surfaces of successive setup tables in said row and said spacing therebetween, said first end of said press assembly comprising four support points configured such that at least three of said support points are in contact with at least one of said tables at any point during the movement of said press assembly across said space between successive setup tables.

12. An apparatus in accordance with claim 11 wherein said press assembly is further mounted, at a second end, for movement across said work surfaces of successive setup tables in said row and said spacing there between, said second end of said press assembly comprising four support points configured such that at least three of said support points are in contact with at least one of said tables at any point during the movement of said press assembly across said space between successive setup tables.

13. An apparatus in accordance with claim 12 wherein a maximum distance between adjacent truss setup tables in said row of spaced truss setup tables is X, and a centerline distance between any two adjacent support points is greater than X.

14. An apparatus in accordance with claim 13 wherein each said support point comprises a wheel coupled to said press assembly.

15. An apparatus in accordance with claim 14 wherein said wheels comprise a polyurethane material.

16. An apparatus in accordance with claim 14 wherein said press assembly is a roller press assembly.

17. An apparatus in accordance with claim 16 wherein said press assembly further comprises:

a frame;

a roller coupled to said frame, said roller configured to embed the nailing plate teeth into the truss members; and a motor rotatably coupled to said roller and said drive wheels.

18. An apparatus in accordance with claim 17 wherein said roller and said drive wheels are configured to rotate so that a surface speed of said roller is equal to a surface speed of said drive wheels.

19. An apparatus in accordance with claim 17 wherein said frame comprises an elongate horizontal portion having a first end and a second end, a first vertical portion depending from said first end of said horizontal portion, and a second vertical portion depending from said second end of said horizontal portion.

20. An apparatus in accordance with claim 19 wherein said press assembly comprises at least four drive wheels and at least four pressure wheels coupled to said first vertical portion of said frame, and at least four drive wheels and at least four pressure wheels coupled to said second vertical portion of said frame.

21. An apparatus in accordance with claim 20 wherein said drive wheels are configured so that at least three of said drive wheels coupled to said first vertical portion and at least three of said drive wheels coupled to said second vertical portion are in contact with said wheel guides at any point during the movement of said press assembly across said space between successive setup tables.

22. An apparatus in accordance with claim 20 wherein each said pressure wheel is in substantial vertical alignment with a corresponding drive wheel.

23. An apparatus in accordance with claim 17 wherein said motor is operatively coupled to said roller, said drive wheels, and said pressure wheels.

24. An apparatus in accordance with claim 23 further comprising a plurality of floor wheels rotatably coupled to said frame and to said motor, said floor wheels configured to engage a floor.

25. An apparatus in accordance with claim 13 wherein at least two of said wheels coupled to said first end and at least two of said wheels coupled to said second end of said press assembly are drive wheels, said wheels configured such that at least one drive wheel coupled to said first end and at least one drive wheel coupled to said second end of said press assembly is in contact with one of said truss setup tables at any point during the movement of said press assembly across said space between successive setup tables.

26. An apparatus in accordance with claim 25 wherein each said truss setup table comprises two wheel guides, one said guide coupled to a first edge of said table and a second guide coupled to a second, opposing, edge of said truss setup table, and said row of spaced truss setup tables configured so that said guides coupled to said first edge of said truss setup tables are in substantial alignment, and said guides coupled to said second edge of said truss setup tables are in substantial alignment.

27. An apparatus in accordance with claim 25 wherein said press assembly further comprises a plurality of reaction pressure wheels, said drive wheels and said pressure wheels configured to engage said wheel guides.

28. An apparatus in accordance with claim 27 wherein each said truss setup table wheel guide comprises a box-shaped channel member having a top and a bottom.

29. An apparatus in accordance with claim 28 wherein said drive wheels engage said top of said box-shaped channel members and said pressure rollers engage said bottom of said box-shaped channel members.

30. An apparatus in accordance with claim 27 wherein said wheel guide further comprises a support plate configured to couple to said truss setup table edge and to said box shaped channel member.

31. An apparatus in accordance with claim 26 wherein each said truss setup table wheel guide comprises two L-shaped channel members, an upper L-shaped channel member configured to overlie a side and a top of said truss setup table, and a lower L-shaped channel member configured to overlie said side and a bottom of said truss setup table.

32. An apparatus in accordance with claim 31 wherein said drive wheels engage said upper L-shaped channel members and said pressure rollers engage said lower L-shaped channel members.

33. A method of converting spaced truss setup tables to support a gantry press apparatus, the setup tables having substantially coplanar work surfaces and arranged in a row, the gantry press apparatus configured to be mounted at each end for movement across the work surfaces of successive setup tables in the row and the spacing therebetween, said method comprising the steps of:

coupling a wheel guide to a first edge of each truss setup table so that the wheel guides are substantially parallel to the work surface of each truss setup table; and coupling a wheel guide to a second opposing edge of each truss setup table so that the wheel guides are substantially parallel to the work surface of each truss setup table.

34. A method in accordance with claim 33 wherein each truss setup table wheel guide comprises a box-shaped channel member having a top and a bottom.

35. A method in accordance with claim 34 wherein said method further comprises the step of coupling support plates to the first and second edges of each truss setup table prior to coupling the wheel guide to each table, each support plate configured to be positioned between the edge of the truss setup table and the wheel guide.

* * * * *